(12) United States Patent
Naderer

(10) Patent No.: US 12,331,775 B2
(45) Date of Patent: Jun. 17, 2025

(54) SHAFT COUPLING FOR MACHINE TOOLS

(71) Applicant: FerRobotics Compliant Robot Technology GmbH, Linz (AT)

(72) Inventor: Ronald Naderer, Linz (AT)

(73) Assignee: Horiba Europe GmbH, Darmstadt (DE)

( * ) Notice: Subject to any disclaimer, the term of this patent is extended or adjusted under 35 U.S.C. 154(b) by 381 days.

(21) Appl. No.: 17/785,283

(22) PCT Filed: Dec. 17, 2020

(86) PCT No.: PCT/EP2020/086748
§ 371 (c)(1),
(2) Date: Jun. 14, 2022

(87) PCT Pub. No.: WO2021/122977
PCT Pub. Date: Jun. 24, 2021

(65) Prior Publication Data
US 2023/0030445 A1    Feb. 2, 2023

(30) Foreign Application Priority Data

Dec. 19, 2019   (DE) .......................... 202019107127.3

(51) Int. Cl.
*F16B 7/02* (2006.01)
(52) U.S. Cl.
CPC ..................... *F16B 7/02* (2013.01)
(58) Field of Classification Search
CPC ....... B23B 31/00; B23B 31/02; B23B 31/006; B23B 31/20; B23B 29/06; B23Q 11/0032
See application file for complete search history.

(56) References Cited

U.S. PATENT DOCUMENTS

| | | | | |
|---|---|---|---|---|
| 3,395,927 A | * | 8/1968 | Hammond | B23B 31/208 279/51 |
| 4,436,463 A | * | 3/1984 | Rea | B23B 31/113 279/82 |
| 4,583,890 A | * | 4/1986 | Ewing | B23B 31/006 409/234 |
| 4,604,010 A | * | 8/1986 | Reeves | B23B 31/266 409/233 |
| 4,607,989 A | * | 8/1986 | Kitamura | B23B 31/006 408/239 R |
| 4,714,389 A | * | 12/1987 | Johne | B23B 31/2025 279/158 |

(Continued)

FOREIGN PATENT DOCUMENTS

| | | |
|---|---|---|
| DE | 578974 C | 6/1933 |
| DE | 3916315 A1 | 11/1990 |
| DE | 102017119524 A1 | 2/2019 |

*Primary Examiner* — Daniel J Wiley
(74) *Attorney, Agent, or Firm* — Murphy, Bilak & Homiller, PLLC

(57) ABSTRACT

The present disclosure relates to a device with a spindle for a machine tool, with a tool holder and a driver ring that is rotationally fixed on the spindle and can be displaced along a rotational axis of the spindle. The spindle and the tool holder have matching faces which are designed to form a frictionally engaged connection when assembled. The opposing faces of the tool holder and of the driver ring have matching contours so that the driver ring can engage on the tool holder.

20 Claims, 4 Drawing Sheets

(56) References Cited

U.S. PATENT DOCUMENTS

| | | | | |
|---|---|---|---|---|
| 4,726,721 A * | 2/1988 | Heel | B23B 31/265 | 408/239 R |
| 4,818,161 A * | 4/1989 | Cook | B23B 31/006 | 279/900 |
| 5,074,723 A * | 12/1991 | Massa | B23B 31/006 | 82/903 |
| 5,125,777 A * | 6/1992 | Osawa | B23B 31/00 | 408/239 R |
| 5,352,073 A * | 10/1994 | Kitaguchi | B23B 31/006 | 408/239 R |
| 5,368,421 A * | 11/1994 | Head | B23B 31/202 | 279/42 |
| 5,407,308 A * | 4/1995 | Takayoshi | B23B 31/005 | 409/234 |
| 5,593,258 A * | 1/1997 | Matsumoto | B23B 31/006 | 408/239 R |
| 5,964,556 A * | 10/1999 | Toyomoto | B23B 31/202 | 409/234 |
| 5,975,816 A * | 11/1999 | Cook | B23Q 17/0976 | 279/158 |
| 5,997,226 A * | 12/1999 | Tagami | B23B 31/006 | 409/234 |
| 6,071,219 A * | 6/2000 | Cook | B23Q 17/0976 | 408/239 R |
| 6,077,003 A * | 6/2000 | Laube | B23B 31/006 | 409/234 |
| 6,109,842 A * | 8/2000 | Cook | B23B 27/002 | 279/158 |
| 6,135,684 A * | 10/2000 | Senzaki | B23B 31/20 | 408/239 R |
| 6,224,306 B1 * | 5/2001 | Hiroumi | B23B 31/006 | 279/143 |
| 6,382,888 B2 * | 5/2002 | Cook | B23Q 17/0976 | 279/158 |
| 6,409,439 B1 * | 6/2002 | Riviere | B23B 31/006 | 408/239 R |
| 6,467,381 B1 * | 10/2002 | Frecska | B23B 31/006 | 82/158 |
| 6,923,451 B2 * | 8/2005 | Taguchi | B23B 31/20125 | 279/42 |
| 7,131,797 B2 * | 11/2006 | Kai | B23Q 11/0032 | 409/141 |
| 7,284,938 B1 * | 10/2007 | Miyazawa | B23B 31/006 | 409/141 |
| 7,331,585 B2 * | 2/2008 | Lindstrom | B23B 31/208 | 279/156 |
| 8,043,036 B2 * | 10/2011 | Cook | B23B 31/006 | 409/234 |
| 8,607,435 B2 * | 12/2013 | Yeh | B24D 5/16 | 407/31 |
| 9,004,498 B2 * | 4/2015 | Haimer | B25B 13/5008 | 279/42 |
| 9,475,139 B2 * | 10/2016 | Mikado | B23C 5/26 | |
| 10,259,049 B2 * | 4/2019 | Jansen | B23B 31/1107 | |
| 10,335,911 B1 * | 7/2019 | Huang | B23Q 5/04 | |
| 11,135,657 B2 * | 10/2021 | Fautz | B23B 31/1076 | |
| 2003/0223837 A1 * | 12/2003 | Komine | B23B 31/11 | 409/234 |
| 2003/0228199 A1 * | 12/2003 | Matsumoto | B23B 31/006 | 409/141 |
| 2005/0175425 A1 * | 8/2005 | Watanabe | B23B 31/006 | 408/239 R |
| 2005/0214087 A1 * | 9/2005 | Agapiou | B23B 31/006 | 409/141 |
| 2008/0260483 A1 * | 10/2008 | Cook | B23Q 11/0032 | 409/234 |
| 2009/0116912 A1 * | 5/2009 | Jansen | B23B 31/1076 | 407/104 |
| 2009/0155010 A1 * | 6/2009 | Cook | B23Q 11/0032 | 409/141 |
| 2014/0044497 A1 * | 2/2014 | Mikado | B23B 31/006 | 409/234 |
| 2015/0030407 A1 * | 1/2015 | Chen | B23B 29/022 | 409/234 |
| 2022/0040808 A1 * | 2/2022 | Chen | B24B 55/12 | |

* cited by examiner

Section A-A (a)

Section B-B (b)

(c)

SHAFT COUPLING FOR MACHINE TOOLS

TECHNICAL FIELD

The present disclosure relates to a shaft coupling for connecting a tool holder to the motor shaft of a machine tool.

BACKGROUND

Shaft couplings are used in a large number of machine tools (e.g. drills, lathes, grinders, etc.) in which a rotatable tool with the drive shaft (e.g., motor shaft or output shaft of a gearbox) is to be connected to a machine tool. The tool can be assembled to a short shaft, which is referred to as a tool holder. The drive shaft of a machine tool is often also referred to as a spindle and has a mechanism that can be used to mechanically couple the tool holder and tool to the motor shaft. This mechanism comprises, for example, a collet which is designed to grip a pull stud of the tool holder and to connect the tool holder to the motor shaft in a frictionally engaged manner.

The frictionally engaged connection between tool holder and motor shaft is usually realized with the help of a conical seat. Tool holders are therefore often referred to as tool cones. The collet can be actuated pneumatically, for example. In this case, a pneumatic actuator with the collet pulls the tool cone (on the pull stud) against a matching inner cone in the motor shaft (spindle), which creates a frictionally engaged coupling between the motor shaft and the tool cone.

In small, compactly designed machine tools, the space for the actuator that actuates the collet is comparatively small; and for this reason, the actuator force that can be generated and which is available to tension the tool cone in the spindle, is also relatively small. As a result, the conical seat between the tool cone and the spindle cannot transmit sufficient torque and there is a risk that the conical seat will start to slip.

One of the objects of the present disclosure can therefore be seen as providing a shaft coupling for machine tools which, with a relatively small size, enables problem-free torque transmission between the spindle and the tool holder.

SUMMARY

A device is described below which, according to one exemplary embodiment, has a spindle for a machine tool, a driver ring and a tool holder. The driver ring is fixed on the spindle in such a way that it can be displaced along a rotational axis of the spindle. The spindle and the tool holder have matching faces which are designed to form a frictionally engaged connection when assembled (to one another). When assembled, opposing faces of the tool holder and the driver ring have matching contours, so that the driver ring can engage on the tool holder.

According to a further exemplary embodiment, the device has a spindle for a machine tool, a driver ring fixed on the spindle, and a tool holder. The spindle is designed as a hollow shaft with an inner cone. The driver ring can be displaced along a rotational axis of the spindle, and the tool holder has an outer cone that matches the inner cone, wherein, when assembled, the inner cone and outer cone form a conical seat, and wherein, when assembled, opposing faces of the tool holder and the driver ring have matching contours, so that the driver ring can engage on the tool holder.

In one exemplary embodiment, when assembled, the conical seat creates a frictionally engaged connection between the spindle and the tool holder, while the engaged driver ring additionally creates a form-fitting connection between the spindle and the tool holder. According to one exemplary embodiment, the tool holder can have a pull stud which is shaped in such a way that the tool holder on the pull stud can be pressed against the spindle by means of a collet.

According to one exemplary embodiment, the tool holder can have a plate which extends in a radial direction with respect to a rotational axis of the tool holder and which has a geometric structure (e.g. in the form of webs or the like) on a surface opposite the driver ring. The driver ring can have a geometric structure (e.g. in the form of grooves or the like) on its surface opposite the plate, with the geometric structure on the surface of the plate and the geometric structure on the surface of the driver ring having matching contours, so that the geometric structure on the surface of the driver ring can engage on the geometric structure on the surface of the plate.

In one exemplary embodiment, a spring element, which acts between the spindle and the driver ring, presses the driver ring against the tool holder. According to one exemplary embodiment, the driver ring can have sliding blocks which are arranged in a displaceable manner in matching guide grooves in the spindle. The spindle can have two end stops (e.g. in the guide grooves), which limit the movement of the driver ring in two directions.

BRIEF DESCRIPTION OF THE DRAWINGS

Various exemplary embodiments are explained in more detail below using the examples shown in the figures. The illustrations are not necessarily to scale and the the present disclosure is not limited solely to the aspects illustrated. Rather, emphasis is placed on presenting the principles underlying the illustrated exemplary embodiments. In the figures.

DETAILED DESCRIPTION

Figure 1:
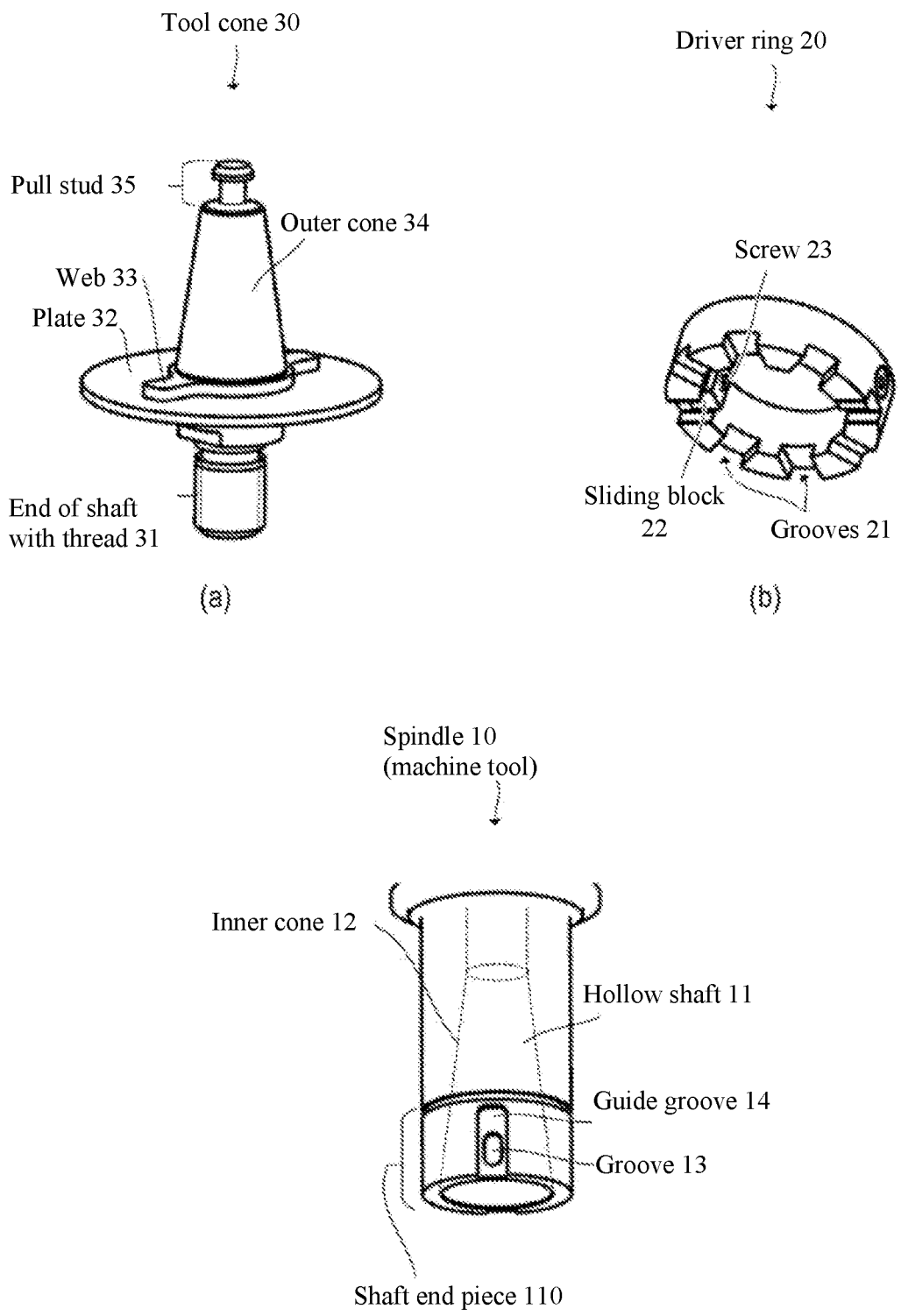
FIG. 1 illustrates tool cone (diagram a), driver ring (diagram b) and the end of the spindle of a machine tool (diagram c) as components of a shaft coupling according to an exemplary embodiment.

FIG. 1 illustrates a tool cone 30 (diagram a), a driver ring 20 (diagram b), and an end piece of a spindle 10 of a machine tool (diagram c) according to an exemplary embodiment. When coupled (i.e., when a tool is assembled to the machine tool), tool cone 30 and spindle 10 are coupled by means of a conical seat, with driver ring 20 preventing the tool cone 30 from slipping through in addition to the frictionally engaged connection in the conical seat by creating a form-fitting connection between spindle 10 and tool 30. The individual components of the example described here are explained below, and the coupling of tool cone 30 and spindle 10 is then described with reference to FIGS. 2-5.

FIG. 1, diagram a, shows an exemplary embodiment of a tool cone 30. Accordingly, the tool cone 30 is a short shaft with an outer cone 34 which fits into a matching inner cone in the spindle 10 and forms a conical seat when assembled. A pull stud 35 is located at a first end of the shaft and can be gripped by a matching collet (not shown). A thread 31 can be arranged at a second end of the shaft, which allows assembly of a rotatable tool (not shown, e.g. a grinding wheel). The (screw) connection of tool and tool cone by means of a thread is a common technique and is therefore not described further here. Instead of a screw connection, other connection techniques can also be used (bayonet lock, clamp connection, etc.).

In the central area of the tool cone 30, said tool cone 30 has a plate 32 which extends essentially at right angles to the rotational axis of the tool cone 30. The plate 32 can have a circular contour on the outside, but this does not necessarily have to be the case. On the side facing the spindle 10 (when assembled), the plate has webs 33 on its surface, which enable an engaging connection between the plate 32 and the driver ring 20.

FIG. 1, diagram b, shows an exemplary embodiment of the driver ring 20 mentioned, which is fixed on the spindle 10 and can be displaced along a rotational axis (and is guided along the same, for example). The driver ring 20 has on its inside two or more sliding blocks 22, which can be used to guide the driver ring 20 in matching grooves of the spindle 10. This guiding enables a displacement of the driver ring 20 along the rotational axis, the possible displacement path of the driver ring 20 being limited by two end stops. On its bottom side (i.e. the side facing the plate 32 of the tool cone 30), the driver ring 20 has several grooves 21 on which the mentioned webs 33 of the plate 32 can engage, forming a form-fitting connection between the plate 32 of the tool cone 30 and the driver ring 20 fixed on the spindle 10. When the spindle 10 rotates, the driver ring 20 fixed on the spindle 10 also rotates, and said driver ring 20 takes the tool cone 30 along with it due to the form-fitting connection. This prevents the conical seat from slipping.

So that the driver ring 20 reliably engages into the webs 33 of the plate 32, the driver ring 20 is pressed against the plate 32 by means of a spring element (see FIGS. 2-5). It should be understood that the form-fitting connection between driver ring 20 and plate 32 of tool cone 30 does not necessarily have to be realized by means of matching webs and grooves. Alternatively, matching pins and holes, matching detents and depressions, and the like would be possible. In general, driver ring 20 and plate 32 have matching contours on the opposing surfaces which are capable of interlocking to form a form-fitting connection. The specific configuration of the matching contours is not important and can be implemented in many different ways.

FIG. 1, diagram c, shows an exemplary embodiment of the spindle 10 of a machine tool. According to the example shown, the spindle 10 has essentially a hollow shaft 11, the interior of the hollow shaft 11 having an inner cone 12 which matches the outer cone 34 of the tool cone 30. As mentioned, inner cone 12 and outer cone 34 form a conical seat when assembled. The spindle 10 has two opposing guide grooves 14 in which (when the driver ring 20 is assembled) the sliding blocks 22 of the driver ring 20 are arranged in a displaceable manner along the rotational axis of the spindle 10. In the example shown, there are further grooves 13 on the bottom of the guide grooves 14. When the driver ring 20 is assembled, screws 23 that are screwed in up to the groove 13, pass through the sliding blocks 22. The driver ring 20 can be displaced along the rotational axis until the lower end of the screw 23 rests against one end of the groove 13. In the example provided, the grooves 13 form (together with the screws 23) the end stops, which limit the displacement of the driver ring 20. It should be understood that the end stops can also be implemented in other ways. The fixation of the driver ring 20 on the spindle 10, which enables the driver ring 20 to be displaced along the rotational axis, is important for the function of said exemplary embodiment. As mentioned, a spring (not illustrated in FIG. 1) can press the driver ring 20 against the lower limit stop (i.e, away from the machine tool) in order to ensure reliable engagement.

FIGS. 2-5 show different positions of the tool cone 30 (relative to the spindle 10) during a coupling process in which the tool cone 30 is mechanically coupled to the spindle 10. In FIGS. 2-5, diagram a shows a cross section through the tool cone 30, diagram b shows a matching longitudinal section and diagram c shows the associated side view. The coupling process can be carried out fully automatically if the machine tool is guided by a robot and the tool cone 30 together with the tool is kept available in a suitable manner, e.g. in a storing space.

Figure 2:
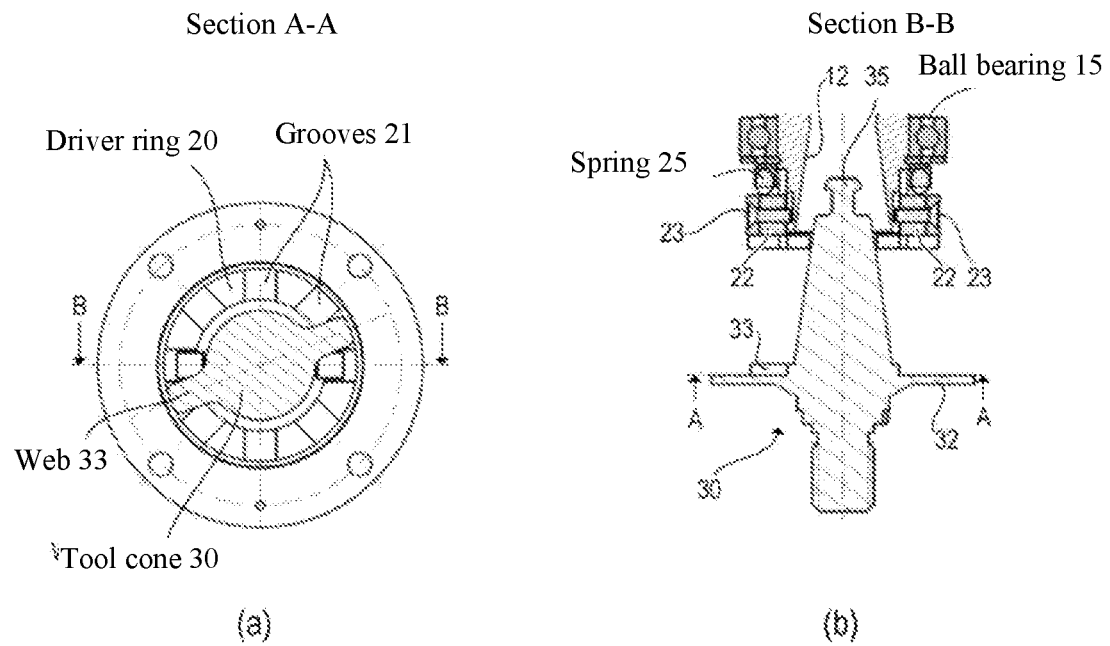
FIGS. 2-5 illustrate the components of the shaft coupling from FIG. 1 in different positions when coupling tool cone and spindle, each in a cross-sectional view (diagram a), longitudinal view (diagram b) and side view (diagram c).
Figure 2:
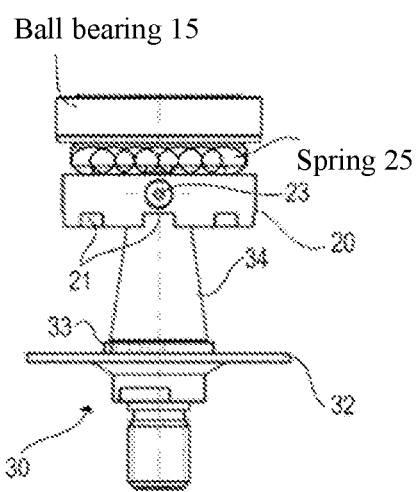

In the situation shown in FIG. 2, the tool cone 30 is about one third inserted into the spindle 10. The pull stud 35 is located inside the hollow shaft 11 and can be gripped in this position by a collet (not shown) which is also arranged inside the hollow shaft 11. Machine tools with a clamping mechanism with a collet arranged in the spindle are known per se and are therefore not discussed further here. For the further discussion it can be assumed that the tool cone 30 on the pull stud 35 is pulled into the spindle with the help of a collet until the outer cone 34 of the tool cone 30 mechanically contacts the inner cone 12 of the spindle 10.

In FIG. 2, diagram b, the above-mentioned guide of the driver ring 20, in particular the sliding blocks 22 and the screws 23, which engage in the grooves 13, are shown. The driver ring 20 is pressed against the lower end stop by the spring element 25. Also shown in FIG. 2, diagram b, is a ball bearing 15 for fixing the spindle 10 in the machine tool. The angular position of the spindle 10 (and consequently also the driver ring) relative to the plate 32 (and the webs 33) can be random in this situation, and in general the tool cone 30 will be twisted relative to the spindle 10 in such a way that the driver ring 20 on the plate 32 can not engage immediately. The spring element 25 can be any flexible (resilient) machine element, for example a spring washer, in particular a multi-wave spring washer, a spring disc or the like, or a piece of elastic plastic.

Figure 3:
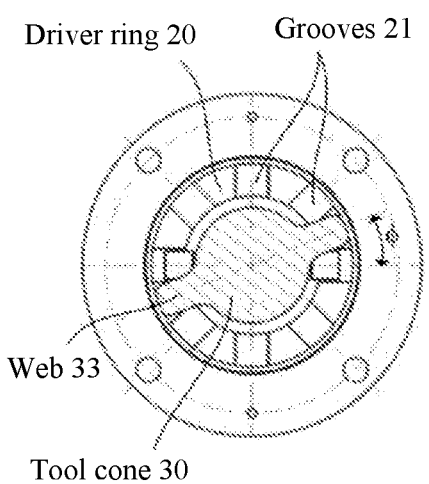
Figure 3:
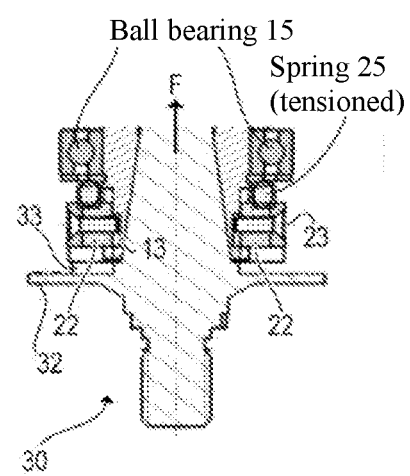
Figure 3:
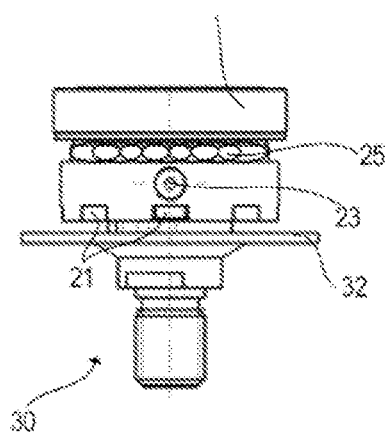

In the situation shown in FIG. 3, the tool cone 30 is fully inserted into the spindle 10, so that the outer cone 34 of the tool cone 30 mechanically contacts the inner cone 12 inside the spindle 10. The tool cone 30 is held on the pull stud by means of the collet (not shown in FIG. 3), and the collet pulls the tool cone 30 into the spindle. The webs 33 of the plate 32 press the driver ring 20 against the spring force of the spring element 25 upwards without engaging. In the position shown in FIG. 3, diagram b, the driver ring 20 was displaced to approximately the upper end stop. FIG. 3, diagram a, shows the angular position $\phi$ of the tool cone 30 relative to the driver ring 20. Engagement of driver ring 20 and webs 33 would be possible at an angle of $\phi=0°$, $\phi=45°$, $\phi=90°$, etc. In FIGS. 2 and 3, the angle $\phi$ is approximately 20°. In the situation shown in FIG. 3, the tool cone 30 is mechanically coupled to the spindle 10, the connection being held in the cone seat only by the frictional engaged connection, but not secured by the driver ring 20 (because the driver ring 20 has not yet engaged). The force (see FIG. 3, force F) is generated by an actuator, not shown in the figures, which uses the collet to press the outer cone 34 of the tool holder 30 against the inner cone 12 of the spindle. As mentioned, suitable clamping mechanisms are known per se and are therefore not explained in more detail here.

Figure 4:
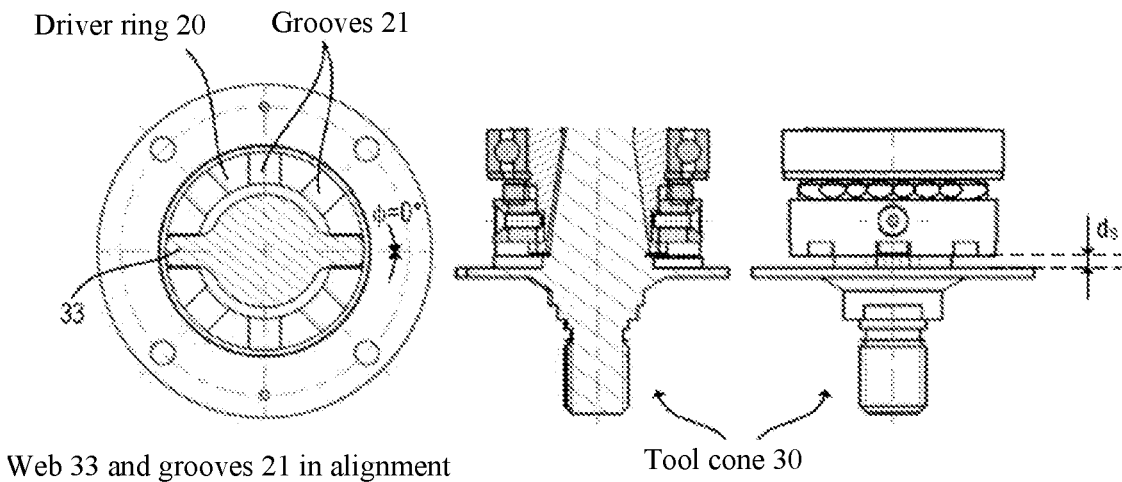
Figure 5:
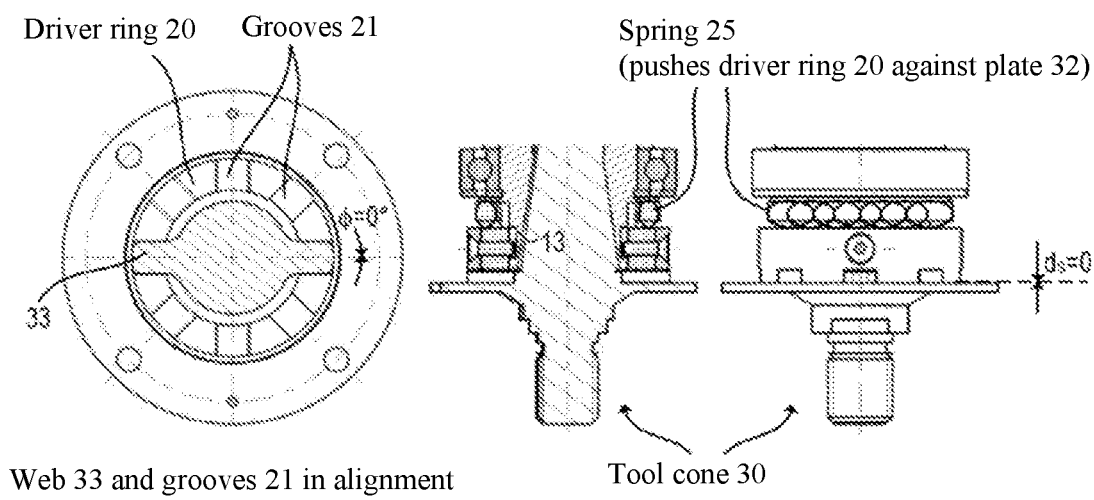

If during operation of the machine tool (e.g. grinding, polishing, milling, etc.) the frictional connection in the cone seat is not sufficient to transmit the required torque, the tool cone 30 will start to slip in the spindle, whereby the tool cone 30 will rotate relative to the spindle 10. That is to say, the angle φ changes. The tool cone 30 will rotate until an angular position φ is reached, which allows the driver ring to engage in the webs 33. FIG. 4 shows this situation) (φ=0° immediately before engaging. In the situation shown in FIG. 4, the angular position of the tool cone relative to the spindle is such that the spring element 25 can press the driver ring 20 against the plate 32 until the webs 33 engage in the grooves 21 of the driver ring 20 and the driver ring 20 engages. FIG. 5 shows the engaged state, in which the driver ring 20 is again approximately in its lower end position and ensures a form-fitting connection between the spindle 10 and the tool cone 30. A further twisting of the tool cone 30 is not possible in this situation.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond-unless otherwise indicated—to any component or structure that performs the specified function of the described component (e.g., that is functionally equivalent), even if it is not structurally equivalent to the disclosed structure that performs the function in the herein illustrated exemplary implementations of the invention.

It will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A device, comprising:
a spindle for a machine tool;
a driver ring mounted and displaceably fixed on the spindle such that the driver ring is displaceable along a rotational axis of the spindle;
a tool holder; and
a spring element which acts between the spindle and the driver ring and presses the driver ring against a plate of the tool holder,
wherein the spindle and the tool holder have matching faces which are designed to form a frictionally engaged connection when assembled,
wherein, when assembled, opposing faces of the tool holder and the driver ring have matching contours, so that the driver ring can engage on the tool holder.

2. The device of claim 1, wherein the spindle is a hollow shaft with an inner cone, wherein the matching faces of the spindle and the tool holder are formed by the inner cone of the hollow shaft and a matching outer cone of the tool holder, which, when assembled, form a conical seat, and wherein the driver ring, when engaged, also creates a form-fitting connection between the spindle and the tool holder.

3. The device of claim 1, wherein the plate of the tool holder extends in a radial direction with respect to a rotational axis of the tool holder, and has a geometric structure on a surface opposite the driver ring.

4. The device of claim 3, wherein the geometric structure comprises webs.

5. The device of claim 3, wherein the driver ring has a geometric structure on a surface opposite the plate, and wherein the geometric structure on the surface of the plate and the geometric structure on the surface of the driver ring have matching contours, so that the geometric structure on the surface of the driver ring can engage in the geometric structure on the surface of the plate.

6. The device of claim 5, wherein the geometric structure on the surface of the driver ring comprises grooves.

7. The device of claim 1, wherein the driver ring has sliding blocks which are arranged in a displaceable manner in matching guide grooves in the spindle.

8. The device of claim 7, wherein the spindle has two end stops which limit the movement of the driver ring in two directions.

9. The device of claim 1, wherein the tool holder comprises a pull stud which is shaped in such a way that the tool holder can be pressed against the spindle on the pull stud by a collet.

10. A device, comprising:
a spindle for a machine tool, the spindle being a hollow shaft with an inner cone;
a driver ring mounted and displaceably fixed on the spindle such that the driver ring is displaceable along a rotational axis of the spindle; and
a tool holder with an outer cone fitting the inner cone;
a spring element which acts between the spindle and the driver ring and presses the driver ring against a plate of the tool holder,
wherein the inner cone and the outer cone form a conical seat when assembled,
wherein, when assembled, opposing faces of the tool holder and of the driver ring have matching contours, so that the driver ring can engage on the tool holder.

11. The device of claim 10, wherein, when assembled, the conical seat creates a frictionally engaged connection between the spindle and the tool holder, and the engaged driver ring also creates a form-fitting connection between the spindle and the tool holder.

12. The device of claim 10, wherein the tool holder comprises a pull stud which is shaped in such a way that the tool holder can be pressed against the spindle on the pull stud by a collet.

13. A device, comprising:
a spindle for a machine tool;
a driver ring mounted and displaceably fixed on the spindle such that the driver ring is displaceable along a rotational axis of the spindle; and
a tool holder,
wherein the spindle and the tool holder have matching faces which are designed to form a frictionally engaged connection when assembled, wherein, when assembled, opposing faces of the tool holder and the driver ring have matching contours, so that the driver ring can engage on the tool holder, wherein the driver ring has sliding blocks which are arranged in a displaceable manner in matching guide grooves in the spindle.

14. The device of claim 13, wherein the spindle is a hollow shaft with an inner cone, wherein the matching faces of the spindle and the tool holder are formed by the inner cone of the hollow shaft and a matching outer cone of the tool holder, which, when assembled, form a conical seat, and wherein the driver ring, when engaged, also creates a form-fitting connection between the spindle and the tool holder.

15. The device of claim 13, wherein the tool holder comprises a plate which extends in a radial direction with respect to a rotational axis of the tool holder, and which has a geometric structure on a surface opposite the driver ring.

16. The device of claim 15, wherein the geometric structure comprises webs.

17. The device of claim 15, wherein the driver ring has a geometric structure on a surface opposite the plate, and wherein the geometric structure on the surface of the plate and the geometric structure on the surface of the driver ring have matching contours, so that the geometric structure on the surface of the driver ring can engage in the geometric structure on the surface of the plate.

18. The device of claim 17, wherein the geometric structure on the surface of the driver ring comprises grooves.

19. The device of claim 13, wherein the spindle has two end stops which limit the movement of the driver ring in two directions.

20. The device of claim 13, wherein the tool holder comprises a pull stud which is shaped in such a way that the tool holder can be pressed against the spindle on the pull stud by a collet.

* * * * *

UNITED STATES PATENT AND TRADEMARK OFFICE
CERTIFICATE OF CORRECTION

PATENT NO. : 12,331,775 B2  
APPLICATION NO. : 17/785283  
DATED : June 17, 2025  
INVENTOR(S) : Naderer Page 1 of 1

It is certified that error appears in the above-identified patent and that said Letters Patent is hereby corrected as shown below:

On the Title Page

Item (73) should read: FerRobotics Compliant Robot Technology GmbH

Signed and Sealed this  
Fifteenth Day of July, 2025

Coke Morgan Stewart  
*Acting Director of the United States Patent and Trademark Office*